L. MURRAY & A. MELVILLE.
REEL.
APPLICATION FILED MAY 13, 1914.
1,119,445.
Patented Dec. 1, 1914.
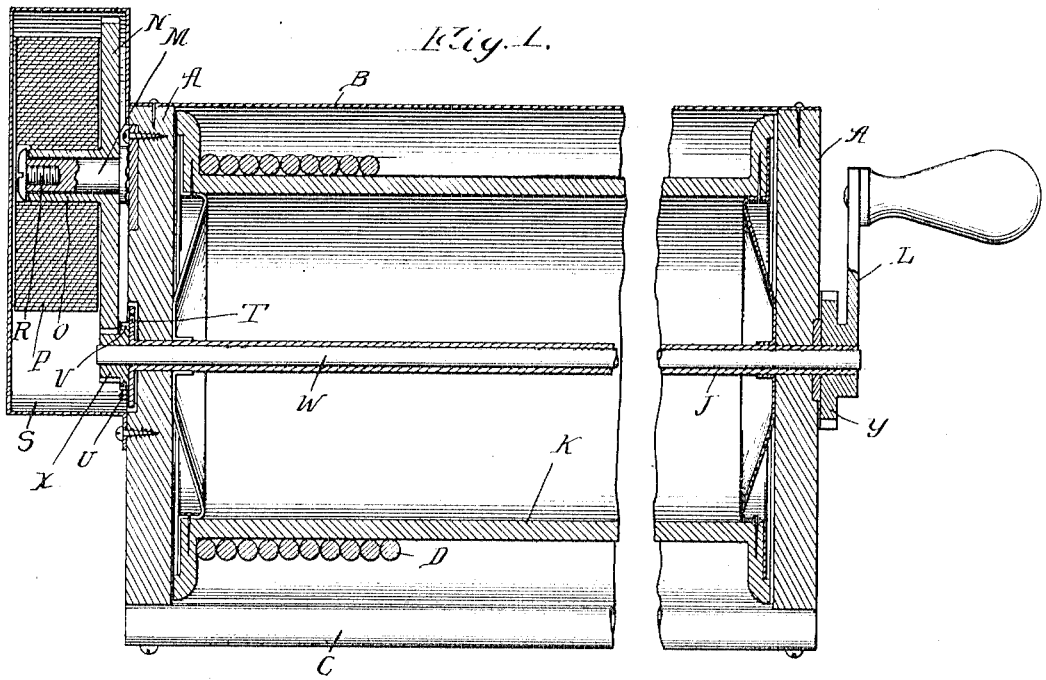
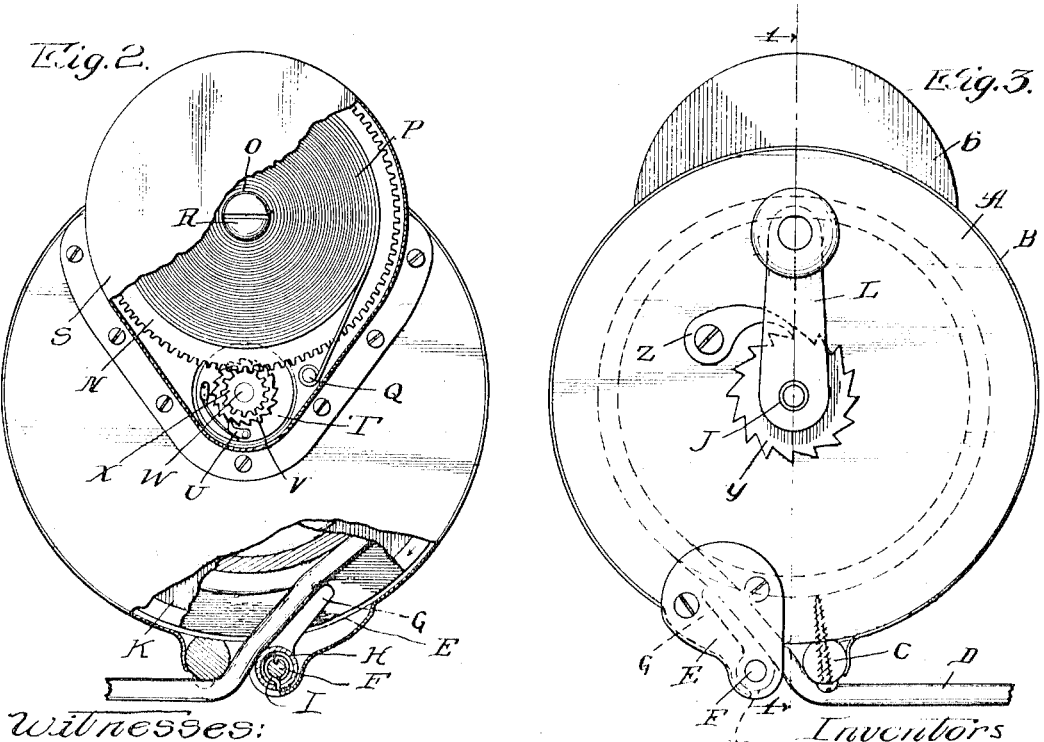
Witnesses:
R. L. Farrington
G. M. Neville
Inventors
Lester Murray
Alvin Melville
By Fotz & Scheible Attys.

UNITED STATES PATENT OFFICE.

LESTER MURRAY AND ALVIN MELVILLE, OF KENOSHA, WISCONSIN.

REEL.

1,119,445.  Specification of Letters Patent.  Patented Dec. 1, 1914.

Application filed May 13, 1914. Serial No. 838,242.

*To all whom it may concern:*

Be it known that we, LESTER MURRAY and ALVIN MELVILLE, of Kenosha, Kenosha county, Wisconsin, both citizens of the United States, have invented certain new and useful Improvements in Reels; and we do hereby declare the following to be a full, clear, and exact description of the invention, such as will enable others skilled in the art to which it appertains to make and use the same.

This invention has for its object to provide an automatic reel particularly adapted for winding up a clothes-line and which may be adapted for use with rope, cord, fishlines, and the like, and consists in the features of construction and combinations of parts hereinafter fully described and claimed.

In the accompanying drawings illustrating the invention: Figure —1— is a view in central longitudinal section taken on the line —1— of Fig. 3, of a reel constructed in accordance with our invention. Fig. —2— is an end elevation of the same partly in section. Fig. —3— is a view in elevation of the opposite end of the device from that shown in Fig. —2—.

The particular objects of the invention are to provide a clothes-line reel having a drum which is spring-actuated in one direction to wind a clothes-line or other cord upon the same, and which is at the same time manually operable in the event that the spring should be insufficiently strong to accomplish the purpose under unusual conditions, and further to provide, in a device of the character set forth, simple and efficient means for causing the rope or cord to wind helically upon the drum from end to end thereof automatically.

Other objects of the invention will be understood from the following description.

The device comprises a housing consisting of two end plates A, preferably of circular form, and to which a cylindrical sheet metal jacket B is secured whereby a cylindrical receptacle is provided. Secured to the end plates A at one point, and extending longitudinally of the housing parallel with the axis thereof is a guide rod C over which the rope or cord D is adapted to pass into said housing. The jacket B terminates at one end at one side of said member C. Mounted upon the periphery of said end walls A of the housing contiguous to the member C but at a distance therefrom are two brackets E in which a shaft F is rigidly secured, the latter extending parallel with said member C. Pivotally mounted on said shaft F is a plate G which projects into the housing, the same having a plurality of hub portions H rotatable on the shaft. A helical spring I engaged with the shaft and with a hub portion H of the plate G serves to normally maintain said plate in a given position, as hereinafter more particularly described. Between the guide rod C and the shaft F is a slot extending from end to end of the housing and through which the clothes-line or other cord passes.

Journaled in the end plates A of the housing is a hollow shaft J carrying the drum K to which one end of the rope or cord D is adapted to be wound; said drum being rigidly mounted on said hollow shaft J in any suitable manner, and being constructed to suit the purposes for which it is intended. The said shaft J is adapted to be manually rotated by means of a crank L rigidly mounted thereon at one end exteriorly of and contiguous to one of the end plates of the housing. Mounted upon the other end plate of the housing A between its circumferential wall and its center is a stud M which projects therefrom axially parallel with the shaft J and upon which a spur gear N is rotatably mounted, the latter having a long hub O upon which one end of a spiral spring P is mounted and non-rotatably secured. The other end of said spring is secured to a pin Q similarly mounted upon the last-named end wall A of the housing. The said spur gear N is held upon said stud M by means of the end screw R in an obvious manner. The said stud, spur gear and spring are inclosed in a sheet metal casing S mounted upon the last-named end wall A of the housing. The other end of said shaft J projects into said casing S and carries a disk T upon which a pawl U is pivotally mounted, said pawl being held by a suitable spring in a well-known manner in engagement with a ratchet-wheel V rigid with the shaft W rotatably mounted in the shaft J. A spur pinion X rigid with the shaft W meshes with said spur gear N.

Rigid with the shaft J and disposed contiguous to the crank L is a ratchet wheel Y adapted to be engaged by the pawl Z pivotally mounted upon the end wall A of the housing, and which is adapted when engaged with said pawl to prevent rotation of the shaft J and drum K in the direction in which it would be normally rotated by unwinding rope from the reel which would occur by the additional strains due to load on the rope. The said crank also enables the line to be manually drawn taut and so maintained.

In operation the rope D is, as previously stated, secured at one end to the drum in any suitable manner and contiguous to one of the annular end flanges of said drum. The rope is primarily wound upon said drum by rotating the latter manually, the pawl U passing over the ratchet wheel V during such rotation and leaving the spring P in its normal condition. In winding the rope upon said drum the plate G serves to force the same into contact with the circumferential face of the drum and thereby causes the rope to wind helically upon the drum from end to end of the latter, and in regular superimposed layers as will be apparent. By then rotating the drum by unwinding the rope D therefrom the spring P will obviously be brought to tension which will increase in exact ratio to the length of rope unwound from the drum and upon releasing the tension on the rope the spring will obviously rotate the drum in the direction to rewind the rope upon the same.

We claim as our invention:

1. A device of the kind specified comprising a housing, a drum having a shaft rotatably mounted in said housing, a crank for manually rotating said shaft, a spring, and gearing establishing operative connection between said spring and said drum for rotating the latter in one direction, said crank adapted to rotate said drum in one direction independently of and without affecting said spring, said gearing including a shaft engaged with said spring and carrying a spur gear, a shaft carrying a ratchet wheel and a spur pinion, the latter meshing with said spur gear, and a pawl non-rotatable relatively to said drum and engaging said ratchet wheel.

2. A device of the kind specified comprising a housing, a drum having a shaft rotatably mounted in said housing, a crank for manually rotating said shaft, a spring, and gearing establishing operative connection between said spring and said drum for rotating the latter in one direction, said crank adapted to rotate said drum in one direction independently of and without affecting said spring, said shaft of said drum being hollow, said gearing including a shaft engaged with said spring and carrying a spur gear, a shaft rotatable in said hollow shaft and carrying a ratchet wheel and a spur pinion, the latter meshing with said spur gear, a disk on said hollow shaft, and a pawl carried by said disk and engaging said ratchet wheel.

3. A device of the kind specified comprising a housing, a drum having a shaft rotatably mounted in said housing, a crank for manually rotating said shaft, a spring, and gearing establishing operative connection between said spring and said drum for rotating the latter in one direction, said crank adapted to rotate said drum in one direction independently of and without affecting said spring, said shaft of said drum being hollow, said gearing including a shaft engaged with said spring and carrying a spur gear, a shaft rotatable in said hollow shaft and carrying a ratchet wheel and a spur pinion, the latter meshing with said spur gear, a disk on said hollow shaft, and a pawl carried by said disk and engaging said ratchet wheel, and a pawl arranged to coact with said ratchet wheel to prevent rotation of said drum by said crank against the action of said spring.

In testimony whereof we have signed our names in presence of two subscribing witnesses.

LESTER MURRAY.
ALVIN MELVILLE.

Witnesses:
WILLIAM S. WEBB,
M. M. BOYLE.